United States Patent
Vu et al.

(10) Patent No.: US 7,895,096 B1
(45) Date of Patent: Feb. 22, 2011

(54) CONSUMER FUTURE PURCHASE TOOL AND METHOD

(75) Inventors: Miriam Nga-Shun Vu, San Francisco, CA (US); Dominic Philip Haine, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 155 days.

(21) Appl. No.: 12/256,375

(22) Filed: Oct. 22, 2008

(51) Int. Cl.
*G07B 17/00* (2006.01)

(52) U.S. Cl. .......................... 705/30; 705/35; 705/36 R; 705/39; 705/40; 705/14

(58) Field of Classification Search ................. 705/30, 705/35, 36 R, 39–40, 14
See application file for complete search history.

(56) References Cited

U.S. PATENT DOCUMENTS

| | | | |
|---|---|---|---|
| 7,698,190 B2 * | 4/2010 | Penkalski et al. ............. | 705/35 |
| 2002/0123949 A1 * | 9/2002 | VanLeeuwen ................ | 705/35 |
| 2003/0055723 A1 * | 3/2003 | English ........................ | 705/14 |
| 2004/0254835 A1 * | 12/2004 | Thomas et al. ................ | 705/14 |
| 2006/0190391 A1 * | 8/2006 | Cullen et al. .................. | 705/37 |
| 2009/0055327 A1 * | 2/2009 | Jones et al. ............... | 705/36 R |
| 2009/0106136 A1 * | 4/2009 | Wright ........................ | 705/35 |

OTHER PUBLICATIONS

Haine, D. Philip, "Getting Gadgets Guilt-Free", www.kpao.org/blog/2008/08/getting-gadgets-guiltfree.html, Aug. 1, 2008, 2 pages.

* cited by examiner

*Primary Examiner*—Vanel Frenel
(74) *Attorney, Agent, or Firm*—Osha • Liang LLP (57) ABSTRACT

The invention relates to a method to help a user save for a future purchase. The method steps include organizing spending data of the user into a plurality of spending categories, wherein the user is saving money for the future purchase, and wherein the user elects to forgo spending in at least one spending category of the plurality of spending categories to facilitate the future purchase, obtaining a savings plan, wherein the savings plan comprises the at least one spending category and a target savings amount, sending a prompt to a user to obtain spending data associated with the savings plan, tracking spending data of the user responsive to the prompt, and generating a notification to the user related to the savings plan based on spending data.

18 Claims, 5 Drawing Sheets

CONSUMER FUTURE PURCHASE TOOL AND METHOD

BACKGROUND

People have a difficult time saving money for a large expenditure that they would like to make in the future. This is particularly true because the process of saving, much like dieting, involves a regular requirement that they give up a tangible benefit, in exchange for a future goal that will remain purely theoretical until a later date. However, unlike dieting, there are not many saving tools on the market.

Most consumers have regular expenditures that are not necessary to one's continued health and happiness. If one can identify those categories of "excess," and track any spending reductions by category, a savings plan may develop naturally. Limiting spending in particular categories also seems more manageable and reasonable for most consumers, thereby increasing the chances of success.

SUMMARY

In general, in one embodiment, the invention relates to a method to help a user save for a future purchase. The method steps include organizing spending data of the user into a plurality of spending categories, wherein the user is saving money for the future purchase, and wherein the user elects to forgo spending in at least one spending category of the plurality of spending categories to facilitate the future purchase, obtaining a savings plan, wherein the savings plan comprises the at least one spending category and a target savings amount, sending a prompt to a user to obtain spending data associated with the savings plan, tracking spending data of the user responsive to the prompt, and generating a notification to the user related to the savings plan based on spending data.

In general, in one embodiment, the invention relates to a system to help a user save for a future purchase. The system includes a server configured to organize spending data of the user into a plurality of spending categories, wherein the user is saving money for the future purchase, and wherein the user elects to forgo spending in at least one spending category of the plurality of spending categories to facilitate the future purchase, a user computing device with functionality to execute a graphical user interface configured to obtain a savings plan, wherein the savings plan comprises the at least one spending category and a target savings amount, and receive a prompt to obtain spending data associated with the savings plan, and a notification module, operatively connected to the server, configured to send a prompt to a user to obtain spending data associated with the savings plan, track spending data of the user responsive to the prompt, and generate a notification to the user related to the savings plan based on spending data.

In general, in one embodiment, the invention relates to a computer readable medium, embodying instructions executable by the computer to perform method steps for helping a user save up for a large purchase. The instructions includes functionality to organize spending data of the user into a plurality of spending categories, wherein the user is saving money for the future purchase, and wherein the user elects to forgo spending in at least one spending category of the plurality of spending categories to facilitate the future purchase, obtain a savings plan, wherein the savings plan comprises the at least one spending category and a target savings amount, send a prompt to a user to obtain spending data associated with the savings plan, track spending data of the user responsive to the prompt, and generate a notification to the user related to the savings plan based on spending data.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to help a user save up for a future purchase. The user provides a spending plan consisting of one or more spending categories in which the user is willing to forgo purchases in order to save money. The user's spending in these categories is tracked, and notifications are provided to the user concerning progress under the savings plan. In one or more embodiments of the invention, advertising related to the spending plan is also served up to the user.

Figure 1:
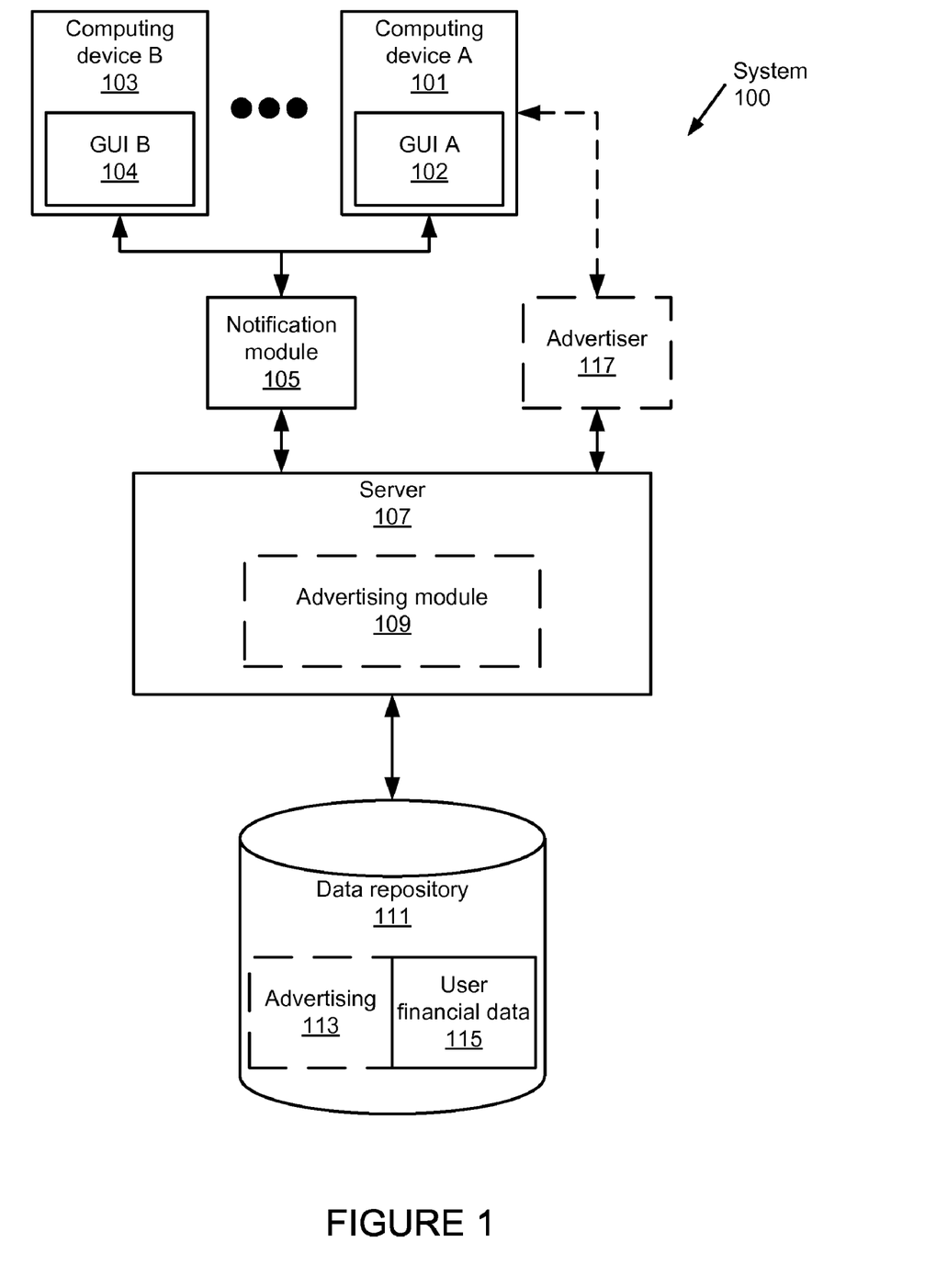
FIGS. 1-2 show diagrams of systems in accordance with one or more embodiments of the invention.

FIG. 1 shows a schematic diagram of a system in accordance with one or more embodiments of the invention. As shown in FIG. 1, the system includes a computing device (e.g., computing device A (101) and/or computing device B (103)), a graphical user interface ("GUI") (e.g., GUI A (102) and/or GUI B (104)), a notification module (105), a server (107), an advertising module (109), an advertiser (117), and a data repository (111). Further, the data repository (111) may contain advertising (113) and/or user financial data (115). These various components are described below.

In one or more embodiments of the invention, the computing device (e.g., 101 and/or 103) is any type of device that may be used to interact with a user (not shown) to facilitate input of a savings plan and spending data, and display a notification. For example, the computing device (e.g., 101 and/or 103) may be a mobile device (e.g., a cellular phone, laptop, personal digital assistant ("PDA"), smart phone, etc.), a computer system (e.g., a desktop computer, a workstation computer system, a gaming console, etc.), or any other such device capable of processing data.

Figure 2:
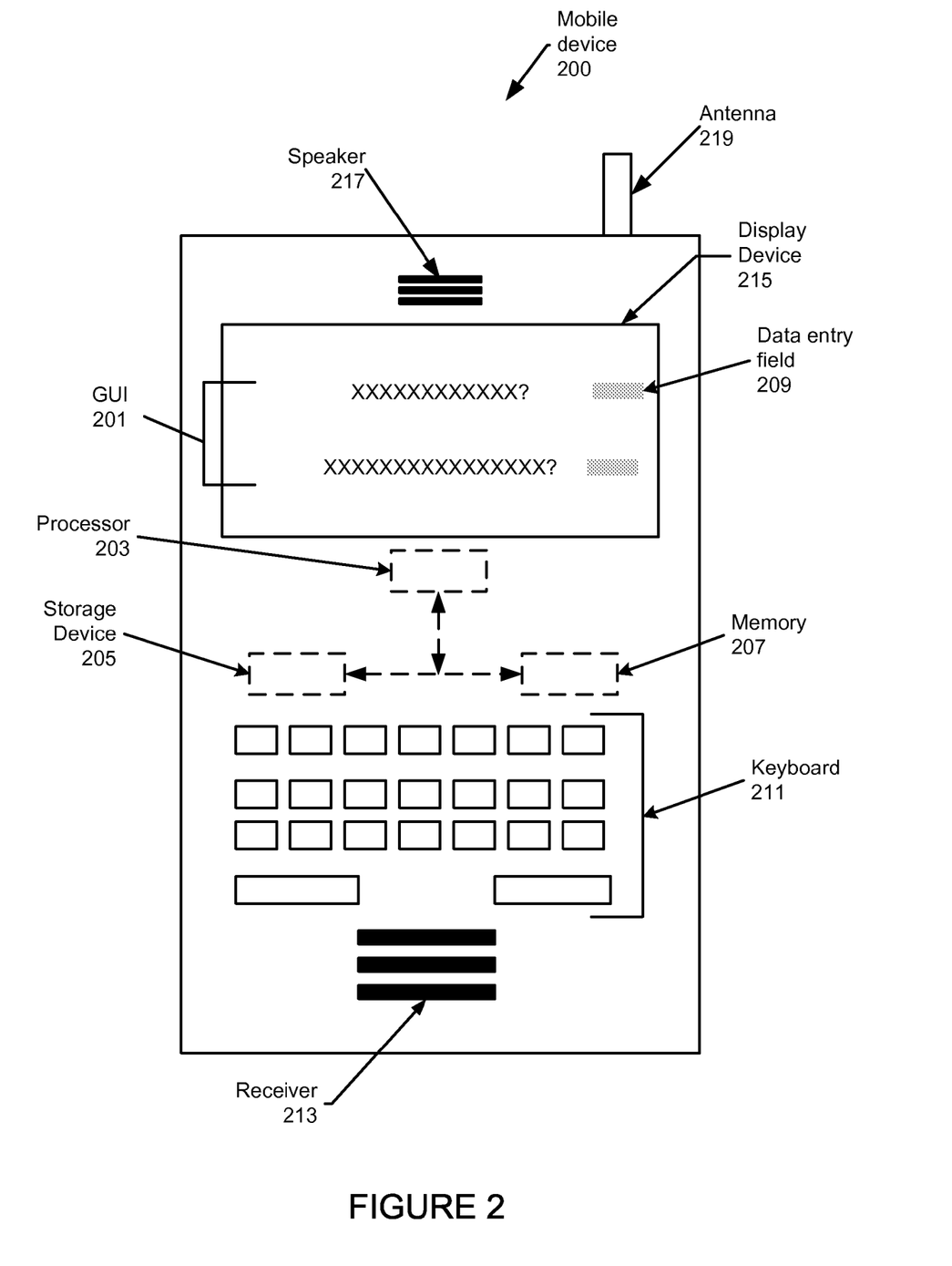

In one or more embodiments of the invention, the computing device (e.g., 101 and/or 103) is a mobile device, such as the device described in association with FIG. 2. As shown in FIG. 2, a mobile device (200), which is essentially the same as the computing device (101 and/or 103) in FIG. 1, may be equipped with a processor (203), associated memory (207), a storage device (205), a receiver (213), a speaker (217), an antenna (219), and numerous other elements and functionalities typical of today's mobile devices.

The mobile device (200) may also include input means, such as a keyboard (211) or touch screen (not shown) that permits a user to enter keystrokes including numeric, alphabetic, and other characters, and output means, such as a display screen (e.g., a liquid crystal display screen) (215). The GUI (201) may be displayed on the display screen (215), which allows users to read prompts and other text. Further, the data entry field(s) (209) enable the user to respond to the prompts using an input device (e.g. keyboard or touch screen, etc.) Those skilled in the art will appreciate that these input and output means may take other forms now known or later developed. The mobile device (200) may be connected to a network (e.g., a local area network (LAN), a wide area network (WAN) such as the Internet, or any other similar type of network) via a network interface connection (not shown). Examples of mobile devices include, but are not limited to, laptop computers, cellular phones, point of sale (POS) terminals, personal digital assistants, personal communicators, pagers, and smart phones.

In one or more embodiments of the invention, the network connection may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc. In one or more embodiments of the invention, the wireless infrastructure may associate any message received from a mobile device (200) with a mobile device identifier of the mobile device (200).

Returning to FIG. 1, the computing device (e.g., 101 and/or 103) may be used to track a savings plan via a GUI. A savings plan may include how much money a user wishes to save, to what spending categories the user allocates his or her current spending, for what purchase the user is saving, how long the user wishes to forgo spending in one or more categories, and other such information. Spending categories may include types of consumer purchases or other financial expenditures that a user has historically made, or intends to make in the future. For example, coffee, beauty products, clothing, shoes, sporting gear, or music are all types of spending categories. Spending data may include information concerning historical spending by the user in one or more spending categories, amount(s) of purchases forgone based on the savings plan, current spending associated with one or more spending categories, costs associated with the one or more spending categories, and other such information. For example, a user may historically spend $30 a day (spending data) eating out at restaurants. The user may wish to forgo eating out (a spending category) to save up $350 in an effort to buy a gift for a close friend's upcoming birthday.

Continuing with FIG. 1, in one or more embodiments of the invention, the computing device includes functionality to interact with one or more users (not shown). A user is an individual or business entity that wishes to save money for a future purchase by forgoing spending in one or more spending categories in accordance with one or more embodiments of the invention.

In one or more embodiments of the invention, the system includes a notification module (105). The notification module (105) may be configured to send a prompt to the computing device to obtain spending data associated with the spending plan, track spending data of the user, and send a notification to the user based on spending data. The notification module (105) may be a stand-alone application operating on a computing device (e.g., 101 and/or 103) or may be a web-based application accessible using a web browser. In some cases, the notification module (105) may include a combination of stand-alone and web-based features. For example, a stand-alone application may be configured to communicate with a back-end server providing shared services to multiple instances of the notification module (105).

As another example, the notification module (105) may execute on a remote computing device (e.g. a server). For example, the notification module (105) may be a web application, or the notification module (105) may be a plug-in to a web browser. Alternatively, the notification module (105) may be a distributed application. In such example, a client portion of the notification module (105) may execute on a computing device (e.g., 101 and/or 103) and a server (107) portion of the notification module (105) may execute on a remote computer system (not shown).

In one or more embodiments of the invention, the notification module (105) includes a user account (not shown) with which spending plan and data are associated. For the purposes of this discussion, a "user account" is a logical construct that is internal to the notification module (105) and used to organize data for a particular user or a defined group of users. The notification module (105) may include multiple user accounts for multiple users. For example, different members of a family or different business groups may have different user accounts in the notification module (105). For example, each member of the family may manage separate spending plans based on respective account for individual savings toward individual goals. In another example, a number of user accounts (e.g., of members of a family) may be linked to manage joint saving efforts toward a shared purchase or a common goal such as a family saving together toward purchasing a new TV.

In one or more embodiments of the invention, the notification module (105) executes on multiple computing devices. For example, the notification module (105) may execute on a mobile device and on a personal computer. In the example, the user is able to access the notification module (105) regardless of whether the user is at a merchant's physical location or at home. For example, the user can notify the system using a mobile device that he or she has forgone a daily mocha latte as the user is walking out of the coffee house (empty-handed). In one or more embodiments of the invention, the notification module (105) on the different computing devices may include functionality to synchronize data with each other. For example, if the user changes the savings plan using notification module (105) on a mobile device and the data is stored locally, then the change may be automatically propagated to the notification module (105) on the user's personal computer.

In one or more embodiments of the invention, the notification module (105) includes a user interface (e.g. a GUI or other suitable interface). In one or more embodiments of the invention, the computing device (e.g., 101 and/or 103) may interact with a user interface (e.g., a GUI (e.g., 102 and/or 104) or other suitable interface) for displaying the notification and receiving input concerning the savings plan and spending data. The user interface may be a web interface, a GUI, a command line interface, an application interface or any other suitable interface. The user interface may also include one or more web pages that can be accessed from a computer with a web browser and/or internet connection. Alternatively, the interface may be an application that resides on a computing system, such as a personal computer, mobile devices, a PDA, and/or other computing devices of the users, and that communicate with one or more components of the system (100) via one or more network connections and protocols. In one or more embodiments of the invention, the user interface (e.g., a GUI or other suitable interface) is specific to the computing device (e.g. personal computer, or other processing device). Specifically, the user interface may include one user interface that accounts for limited screen size of a mobile device and another user interface with increased functionality for a personal computer.

The user interface (e.g., a GUI or other suitable interface) is used to display, among other things, a prompt to the user to obtain spending data. The prompts may include texts, graphics, or other interface elements. The prompt may be presented as one or more windows, which can be arranged using a stacking order.

Various commands may be used to display the prompt, including attributes such as color, highlighting, a link, a data entry field, option list, etc. In one or more embodiments of the invention, a list of options is presented on one line in the active window, but pages of options may be looked through by the user if there are more than can fit on a single line. An option could be selected, for example, by selecting an option from a menu, by scrolling a table of data, or by moving the selection to the desired item and clicking "Enter," or by typing the first letters of the name of the option until a unique match is made with one of the available options, at which point the option is incorporated. The screen array may work either in read-only mode or in an editing mode, where data can be updated, inserted, or deleted.

In one or more embodiments, an event handler may be automatic or set by the user to present the notification at certain times. For example, the user may be prompted every day at 2:00 p.m. as follows: "Did you eat out at lunch today? If so, how much did you spend?" The user may enter an exact amount, or the spending tool may be configured (e.g., based on historical data) to estimate the cost of each event in a particular spending category (e.g., the average cost of lunch). Alternatively, in one or more embodiments, the notification module (105) may track the user's online activities, and present a prompt in response. For example, after the user visits a clothing website, the notification module (105) may send a prompt seeking to determine whether any purchase are made.

The form and presentation of the prompt and notification may vary depending on the type of computing device on which it is displayed and/or user-set preferences. Those skilled in the art, having the benefit of this disclosure, will appreciate that the user interface and prompt presentation may take many different forms, and many different techniques may be used to elicit information from the user concerning spending data.

As shown in FIG. 1, in one or more embodiments, the notification module (105) is communicatively connected to a server (107). The server (107) includes functionality to receive a savings plan and spending data from the notification module (105). Certain steps may be necessary to configure the notification module (105) to work with the server (107). For example, the computing device (e.g., 101 and/or 103) may use a connection processor to establish a connection between the computing device and the server and—in the context of that connection (including access to the server's application/dataset manager)—perform operations related to the associated applications.

A connection processor is a tool that implements the basic mechanisms by which the computing device (e.g., 101 and/or 103) connects to the infrastructure on the server (107). The connection processor establishes the communication channel that allows a connection setting (e.g., uniform resource locator ("URL") or network address of the server) to be used by the computing device (101 and/or 103) such that the connection is authenticated and enabled to allow the user/processor to retrieve data from the notification module (105). The connection processor can be invoked whenever access to or information about the savings plan or spending data is needed. Typically, the connection processor is invoked on demand (a) when the user's interaction with the notification module (105) and/or GUI (e.g., 102 and/or 104) on the computing device (e.g., 101 and/or 103) requires a connection (e.g., an explicit request by the user to log into the server to get a spending data update); or (b) when triggered by an application or system need.

In one or more embodiments of the invention, an advertising module (109), operatively connected to the server (107), includes functionality to receive and link digital files containing advertising (113) to user financial data (115), including a savings plan, that is presented to a computing device (e.g., 101 and/or 103). In one or more embodiments, the advertising (113) is associated with a particular aspect of the savings plan. The advertising (113) may be received either directly from an advertiser (117) or stored in a data repository (111), discussed below. Digital files may take many different forms. For example, the digital files may include web pages, emails, scanned documents, digital photographs, audio recordings, portable document format ("PDF") files, text messages from mobile devices, or any other types of digital files that may include financial data. The advertising module (109) and/or notification module (105) may be configured to import the digital files from a variety of sources, such as web pages, email clients, file system folders, image management applications, network shares, or any other location where digital files may be stored.

Further, digital files may include many different types of advertising content. For example, a digital file may be a hyperlink to a consumer website, local merchant contact information, special offers, rewards program details, or other such information. The aforementioned types of advertising are provided as examples only. A digital file may include many different types of consumer data that are not explicitly disclosed herein but nonetheless fall within the scope of the invention.

In one or more embodiments of the invention, the advertising module (109) may link digital files to records based on metadata describing the digital files, as described herein. Specifically, the advertising module (109) may be configured to parse a digital file to obtain the metadata, allocate the digital file based on the notification module (105), identify a record in the notification module (105) that is associated with the digital file, and link the digital file to the record. For example, if the savings plan identifies the future purchase for which the user is saving is a wedding, the advertising module (109) may serve up wedding-related advertisements to the user. Alternatively, if the user has agreed to forgo cigarettes to save up for a future purchase, the advertising module (109) may serve up advertisements related to products to help quit smoking.

Many different types of metadata may be obtained from a digital file, depending on the type of file and the contents therein. For example, the metadata obtained may include the file extension, the file size, the date and/or time the file was created, the naming convention used for the file, the format of the file contents (e.g., hypertext markup language (HTML), extensible markup language (XML), comma-separated values, or any other type of identifiable format), the colors (if applicable) of elements in the file, specific images included in the file (e.g., a company logo), keywords in the file (e.g., company names, product names, finance-related terms, or any other type of keyword), a URL where the file was obtained, an email address from which the file originated, or any other type of identifiable metadata.

With respect to the format of the contents of the file, metadata may also identify specific structures, such as a specific style sheet or XML schema. In other words, the digital file may conform to a predetermined file specification. In one or more embodiments of the invention, the file specification is provided to the advertising module (109) by the entity (e.g., an advertiser) that generated the digital file. For example, the entity that generated the digital file may be a business using a proprietary file format for digital files of a particular type. Alternatively, the file specification may be provided by the same entity that produced the advertising module (109). Specifically, the entity that produced the advertising module (109) may publish a digital file specification, and other entities may generate digital files using that specification to help facilitate sending the digital files based on the notification module (105). As another alternative, the file specification may be provided by another entity altogether (i.e., neither the entity that generated the digital file nor the entity that produced the advertising module).

The aforementioned types of metadata are provided as examples only. A digital file may include many different types of metadata that are not explicitly disclosed herein but nonetheless fall within the scope of the invention.

For the purposes of this discussion, "linking" means generating an association between a digital file and a notification based on a spending plan associated with user financial data (115), in a manner that makes the association visible to a user of the system (100). For example, linking the digital file to the record may involve placing a hyperlink or icon for the digital file when presenting a notification. Many different representations of the linking are possible. Generally speaking, the linking provides a way for a user to know that the digital file is associated with the record, and to access the digital file in the context of viewing the record using the notification module (105) and/or advertising module (109). Linking may also be used to assign categories to digital files. For example, a digital file may be linked with the category "wedding planning," where digital files having the same category are accessible as a group in the notification.

Continuing with FIG. 1, the data repository (111) is any type of storage unit and/or device (e.g., a file system, database, collection of tables, or any other storage mechanism) for storing data for later access in accordance with one or more embodiments of the invention. Further, the data repository (111) may include multiple different storage units and/or devices. The multiple different storage units and/or devices may or may not be of the same type or located at the same physical site. For example, a portion of the data repository (111) may be on an identity server while another portion is distributed across the Internet. In one or more embodiments of the invention, the data repository (111), or a portion thereof, is secure.

In one or more embodiments of the invention, the data in the data repository (111) includes user financial data (115). User financial data (115) may include income, expenses, amount saved, spending history, savings goal, and other relevant financial information.

Although FIG. 1 shows user financial data (115) and advertising (113) stored in a single data repository, those skilled in the art will appreciate that this data may or may not all be stored in a data repository (111). For example, the storage structure of the data repository (111) may distinguish between general user data and data associated with the managed spending plan. As another example, advertising (113) may be stored remotely, such as in a data repository associated with an advertiser (117). Data may be stored in the data repository (111) using any possible storage structure. For example, the data repository (111) may be a relational database. The data associated with the savings plan, for example, may be stored in one table, spending data may be stored in another table, and the advertising (113) may be stored in another table. The tables, for example, may include cross references to each other.

Although FIG. 1 shows the data repository (111) as a separate component from the computing device (e.g., 101 and/or 103), the computing device (101 and/or 103) may include the data repository (111). Specifically, the data repository (111) may be storage in which at least a portion is local to the computing device (e.g., 101 and/or 103).

Figure 3:
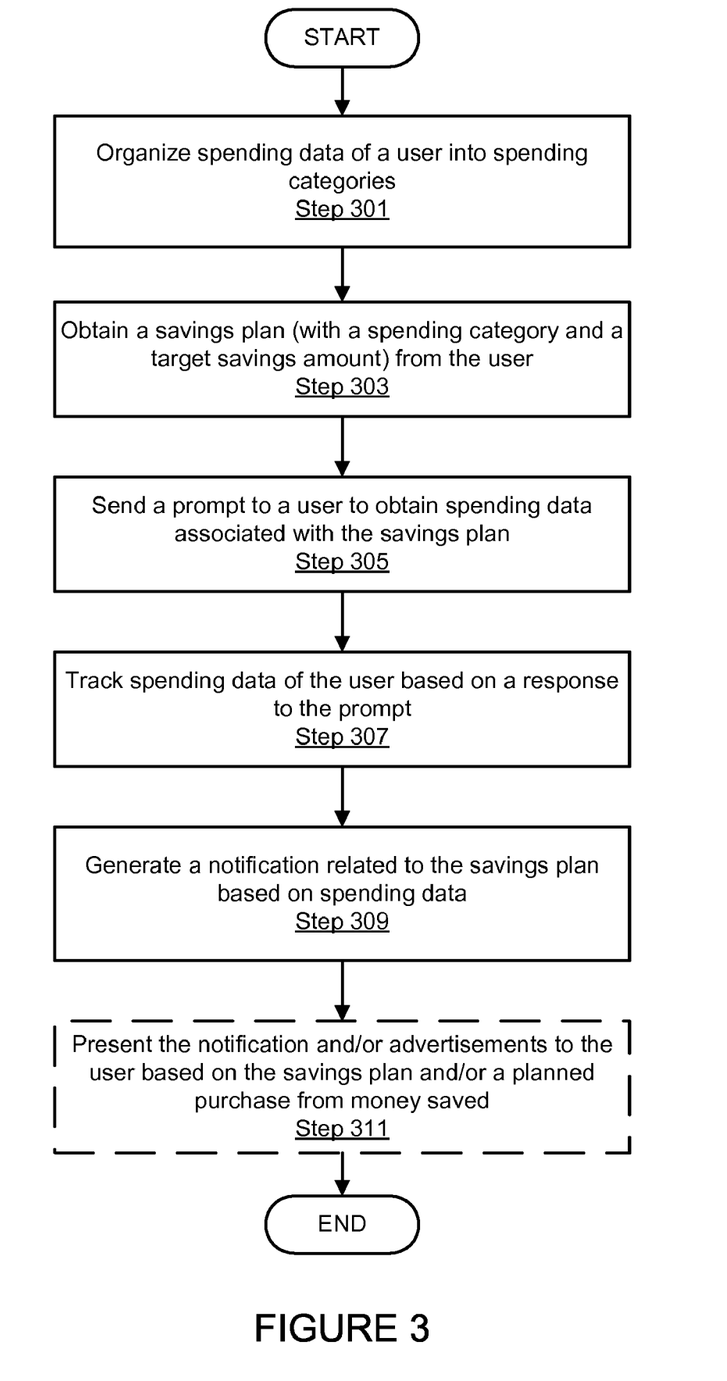
FIG. 3 shows a flowchart of a method in accordance with one or more embodiments of the invention.

FIG. 3 shows a flowchart in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. Additionally, steps such as receive acknowledgements have been omitted to simplify the presentation.

FIG. 3 shows a flowchart of a method for helping users save for a future purchase. As shown in Step 301, in one or more embodiments, a user's spending data is organized into spending categories. Spending data may include, in one or more embodiments, historical spending data ("historical data") and current (i.e., real time or near real time) spending data ("spending data"), both of which are associated with a particular type of purchases or spending. These types of spending data are discussed below. One objective of the savings tool is to aid a user who wishes to forgo making certain types of purchases to save up enough money to purchase a particular item or event. For example, a user may decide to forgo eating out at restaurants and buying clothing to save for his or her wedding. In one or more embodiments of the invention, the savings plan includes at least one spending category and a target savings amount.

In one or more embodiments of the invention, the user provides historical data which may be used to estimate how long or how many more savings events it may take to achieve the target savings amount under the savings plan. For example, a user may provide historical data associated with two spending categories, such as restaurants and clothing. Historical spending data may be obtained in numerous ways. In one or more embodiments of the invention, the user may estimate or provide an exact amount of expenditures in these categories, and the spending data may be broken down by time periods (e.g., annual, monthly, quarterly, etc.). In one or more embodiments, the user may estimate a per event cost (e.g., $20 eating out at lunch, $50 eating out at dinner, $200 each visit to a favorite clothing store, etc.) In one or more embodiments, a financial application associated with the user (e.g., residing locally on the computing device, residing on a remote server, a web application, etc.) may be linked to the savings tool to provide historical spending and/or spending data. Those skilled in the art will recognize that numerous methods exist to generate a savings estimate, either now known or later developed, that do not deviate from the spirit and scope of the present invention.

As shown in Step 303, in one or more embodiments, a savings plan is obtained from the user. The savings plan may include how much money a user wishes to save or target savings amount, at least one spending category in which the user intends to reduce, maintain, or cease future spending, for what purchase the user is saving, how long the user wishes to forgo spending in one or more spending categories, and other such information. In one or more embodiments, the user may modify the spending plan at any time. For example, the user may add additional spending categories for which he/she will forgo or reduce spending, raiser or lower the target savings amount, extend the duration of the savings plan, or any other such change. In one or more embodiments, the user may also set a milestone associated with the savings plan. For example, the user may wish to be notified when the halfway point to the target saving amount or end date of the spending plan is reached.

As shown in Step 305, in one or more embodiments, a prompt is sent to the user to obtain spending data associated with the savings plan. The prompt may involve one or more windows that can contain text and various interface elements. A prompt command may present a message to the user concerning spending data, who then enters a response. For example, the prompt may seek information concerning whether the user purchased coffee today and, if so, how many cups. The user may be prompted to enter an estimated expenditure in that spending category, asked to upload or synchronize spending data from a financial application, or simply enter the number of events (e.g., how many cups of coffee) from which the spending tool can estimate the expenditure based on historical data. In one or more embodiments, prompts may be sent at regular time periods. For example, a prompt seeking spending data related to coffee purchases could be sent every morning before lunch. Alternatively, in one or more embodiments, the user may set his/her preferences regarding the frequency, mode (e.g., e-mail, text message, etc.), and other parameters of the prompts.

As shown in Step 307, in one or more embodiments, spending data of the user is tracked based on a response to the prompt. Specifically, the user is prompted to provide spending data regarding purchases made in the spending category, and this information is tracked and stored. For example, every day that a user gives up eating out lunch, the user estimates this will save $15. If, in response to a daily prompt, the user notifies the system that he/she not eaten lunch out for 4 days in a row, this will result in a total savings of $60 that the system can track.

As shown in Step 309, in one or more embodiments, a notification based on spending data may be generated related to the savings plan. Specifically, a notification is based on spending data which the system has tracked and calculated. A notification may include total (estimated or actual) savings under the spending plan, an estimate regarding future progress, suggestions or tips, alternatives, encouragement, a motivational message, achievement of a milestone, and other such messages. It may be accessed by the user via a website or other remote option, or it may be sent to one or more computing devices of the user by electronic mail, text message, interactive voice recording ("IVR"), mail, facsimile, or other transmission.

As shown in Step 311, in one or more embodiments, the notification may consist of an advertisement related to the savings plan. For example, if the user has indicated as part of the savings plan that he/she is saving to afford a more lavish wedding, the notification may inform the user of a local bridal shop or contain a hyperlink to a website of a specialty baker. The notification may also provide information concerning alternative merchants that are relevant to the spending plan. For example, if the user has selected shoes as a savings category, a notification may contain information or a hyperlink to a discount shoe store. In one or more embodiments, the notification may include information concerning a rewards program associated with the spending plan. For example, the user may be notified that, if he/she achieves the savings plan, a bridal registry merchant will offer a 25 percent discount on all merchandise.

In one or more embodiments, as shown in Step 311, the notification is presented to the user. The notification may be configured to display on one or more user computing devices. For example, the notification may also include one or more web pages that can be accessed from a computer with a web browser and/or internet connection. Alternatively, the notification may be presented by an application that resides on a computing system, such as a personal computer, mobile devices, a PDA, and/or other computing devices of the user. Specifically, the notification may be presented by one user interface that accounts for limited screen size of a mobile device and another user interface with increased functionality for a personal computer.

Figure 4:
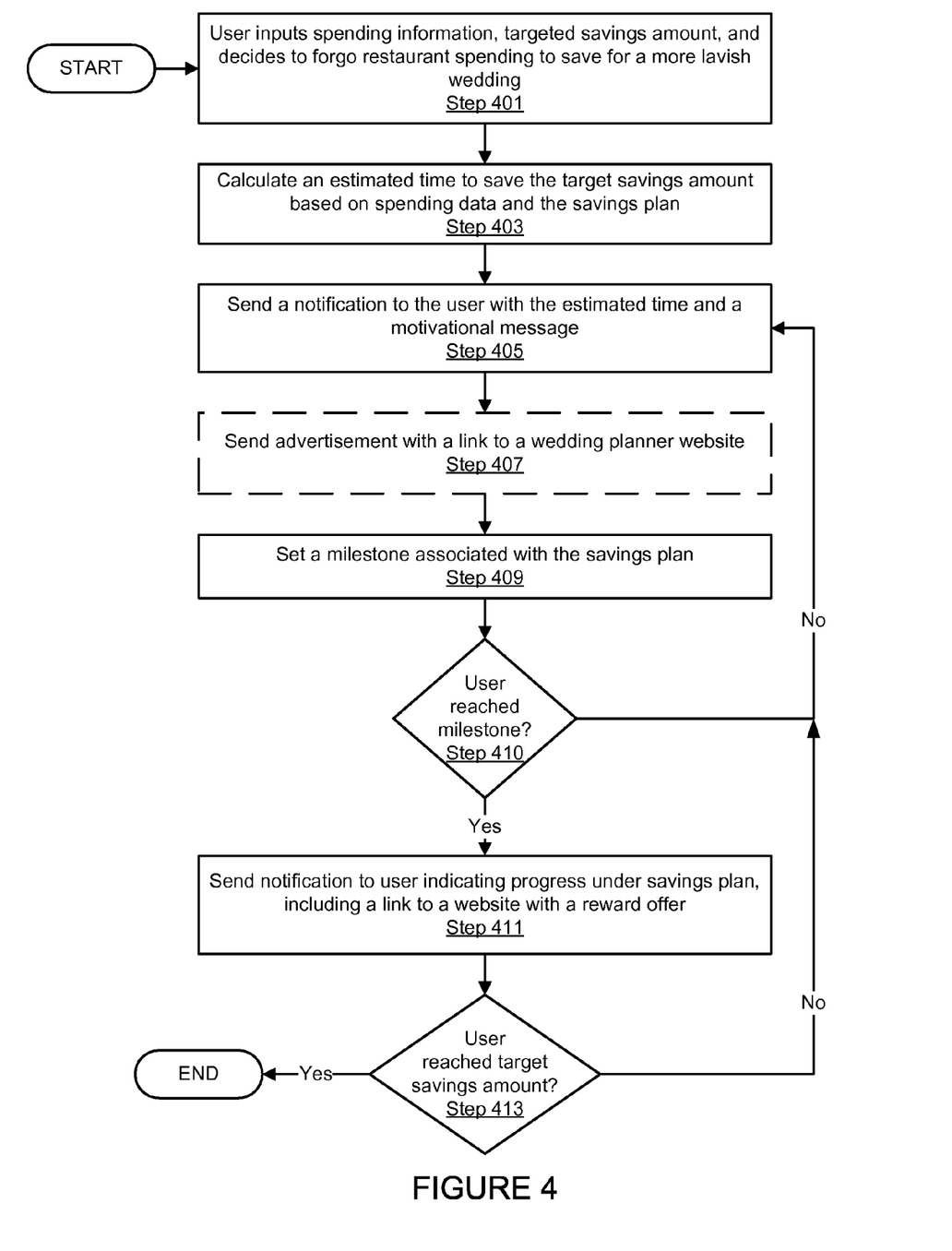
FIG. 4 shows an example in accordance with one or more embodiments of the invention.

FIG. 4 shows an example in accordance with one or more embodiments of the invention. In FIG. 4, the user first inputs spending data and desired savings amount (Step 401). The example user then decides to forgo restaurant spending in order to save for their goal, a more lavish wedding. The system then moves on to the next step.

In Step 403, the system calculates an estimated time to save the desired amount. The system uses the information that the user input in Step 401 to assist it in its calculations.

In the next step, Step 405, the system notifies the user of the estimated time to reach the savings goal. Additionally a motivation message may be displayed such as, "You can do it!" to encourage the user to reach their saving goal. Those skilled in the art will recognize that this display could take a variety of different forms on a variety of different computing and mobile devices.

Optionally, the system may display an advertisement to the user (Step 407), such as a link to a wedding planner website. In one or more embodiments of the invention, this advertisement may be seen in conjunction with a milestone associated with the savings plan (Step 409 and 410). For example, when the user reaches the halfway point of their saving goal, the system could display a message such as, "Congratulations, you are half-way to achieving your target savings amount!"

In one or more embodiments of the invention, as shown by Step 411, a message may include information regarding a rewards program. For example, a notification may state, "If you achieve your first milestone by June 3, you will be eligible to receive a special reward from Brides-R-Us." The notification could include a link to a website with more information concerning the rewards program, a telephone number to call, or other assistance.

In one or more embodiments, personal information obtained using a financial management application of the user may be used to create a notification. For example, the notification could include a suggestion based on the user's personal spending habits, such as: "You could also give up your magazine subscriptions and reach your savings goal faster" or "You can save money if you purchase gasoline at Bob's Station located in San Carlos."

In one or more embodiments of the invention, the parameters for the notification may be set by the user. This information may be presented to the user in a variety of formats, such as text, graphics, or other options. For example, the notification could include a graphical representation (e.g., pie chart, bar graph) of the progress under the savings plan.

Figure 5:
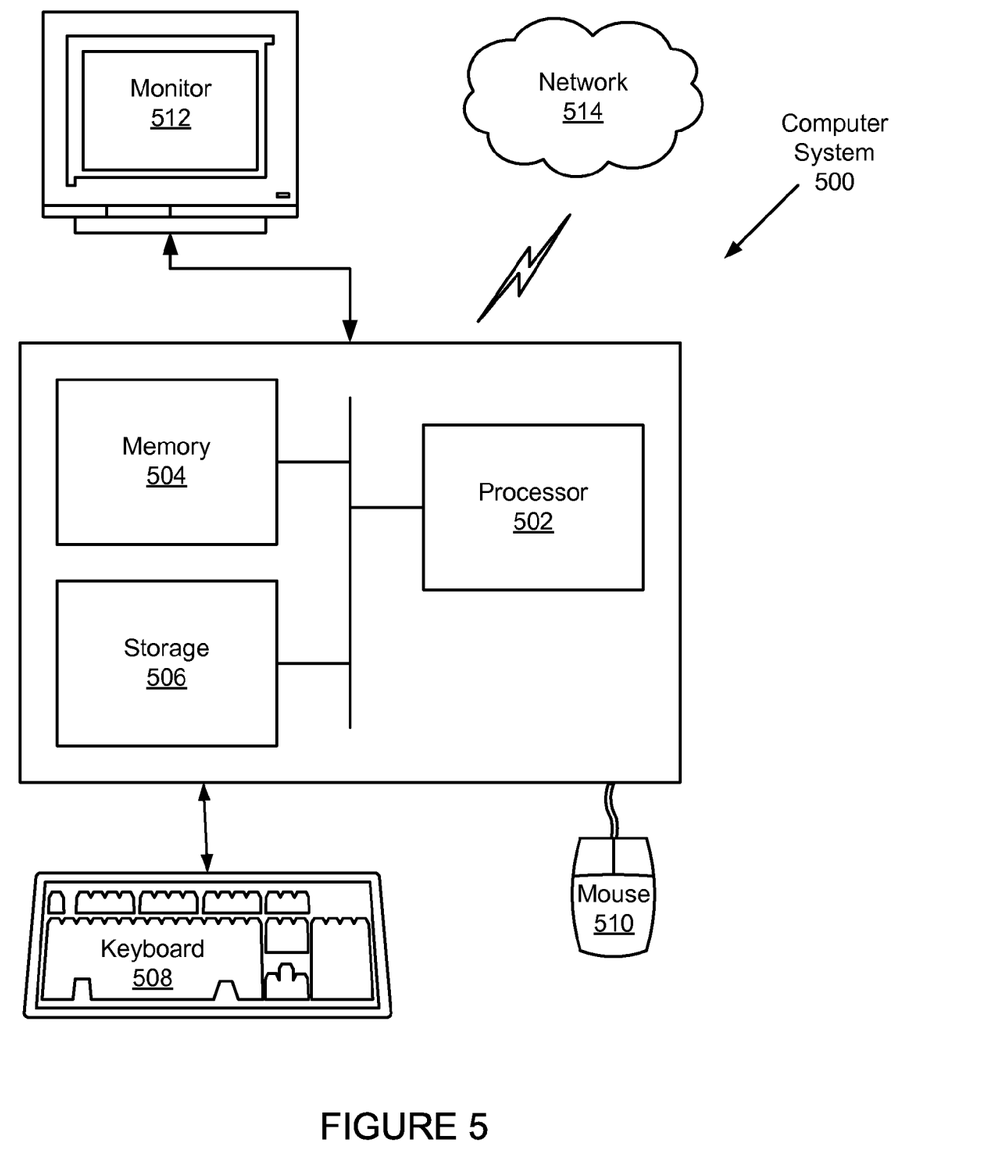
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., report generator, event manager, user application, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to help a user save money for a future purchase, comprising:
   obtaining, using a processor of a mobile computing device, historical spending data from the user;
   organizing, using the processor, historical spending data into a plurality of spending categories;
   obtaining, using the processor, a selection of a first spending category from the user, wherein the first spending category is selected from the plurality of spending categories, and wherein the user elects to forgo spending money on purchases associated with the first spending category;
   obtaining, using the processor, a target savings amount from the user, wherein the target savings amount is how much money the user wants to save for the future purchase;
   sending, using the processor, a prompt to the user to obtain current spending data associated with the first spending category;
   obtaining, using the processor, current spending data from the user in response to the prompt;
   determining, using the processor, an actual savings amount in the first spending category based on current spending data; and
   generating, using the processor, a first notification for the user related to saving money for the future purchase.

2. The method of claim 1, further comprising:
   determining, using the processor, an estimated time to save the target savings amount based on the actual savings amount, the target savings amount, and the historical spending data, wherein the first notification comprises the estimated time.

3. The method of claim 2, further comprising:
   obtaining, using the processor, a modified target savings amount from the user;
   determining, using the processor, a modified estimated time to save the target savings amount based on the actual savings amount, the modified target savings amount, and the historical spending data; and
   generating, using the processor, a second notification for the user related to saving money for the future purchase, wherein the second notification comprises the modified estimated time.

4. The method of claim 1, further comprising:
   setting, using the processor, a milestone associated with saving the target savings amount; and
   when the actual savings amount reaches the milestone:
      generating, using the processor, a second notification for the user confirming that the milestone has been reached.

5. The method of claim 1, further comprising:
   parsing, using the processor, a digital file for metadata, wherein the digital file comprises advertising content and metadata, and wherein the metadata describes the advertising content;
   determining, using the processor, whether the metadata is related to the future purchase; and
   when the metadata is related to the future purchase:
      presenting, using the processor, the advertising content to the user.

6. The method of claim 5, wherein presenting the advertisement comprises sending a link to an advertising website, wherein the advertising website offers low cost alternatives associated with the first spending category.

7. The method of claim 1, further comprising:
   offering, using the processor, a rewards program to the user, wherein the rewards program allows the user to earn a reward associated with the future purchase.

8. A system to help a user save money for a future purchase, comprising:
   a server configured to organize historical spending data of the user into a plurality of spending categories, wherein the user, by selection of a first spending category from the plurality of spending categories, elects to forgo spending money on purchases associated with the first spending category;
   a user computing device with functionality to execute a graphical user interface configured to:
      obtain the historical spending data from the user
      obtain the selection of the first spending category from the user;
      obtain a target savings amount from the user, wherein the target savings amount is an amount of money the user wants to save in the first spending category toward the future purchase;

receive a prompt to obtain current spending data for the user; and obtain the current spending data from the user in response to the prompt;

a notification module, operatively connected to the server, configured to:

send the prompt to obtain current spending data for the user; and generate a first notification to the user related to saving money for the future purchase in the first spending category.

9. The system of claim 8, further comprising a data repository, operatively connected to the server, configured to store the current spending data, the historical spending data, the target savings amount, and the selection of the first spending category.

10. The system of 8, wherein the notification module is further configured to:

determine an actual savings amount in the first spending category based on current spending data;

determine an estimated time to save the target savings amount based on the actual savings amount, the target savings amount, and the historical spending data, wherein the first notification comprises the estimated time.

11. The system of claim 10, wherein the notification module is further configured to:

obtain a modified target savings amount from the user computing device; and determine a modified estimated time to save the target savings amount based on the actual savings amount, the modified target savings amount, and the historical spending data; and generate a second notification to the user related to saving money for the future purpose, wherein the second notification comprises the modified estimated time.

12. The system of claim 8, wherein the notification module is further configured to:

set a milestone associated with saving the target savings amount; and when the actual savings amount reaches the milestone:

generate a second notification for the user confirming that the milestone has been reached.

13. The system of claim 8, further comprising a advertising module, operatively connected to the server, configured to:

parse a digital file for metadata, wherein the digital file comprises advertising content and metadata, and wherein the metadata describes the advertising content;

determine whether the metadata is related to the future purchase; and when the metadata is related to the future purchase:

present the advertising content to the user computing device.

14. The system of claim 13, wherein presenting the advertising content comprises sending a link to an advertising website.

15. The system of claim 13, wherein the advertising module is further configured to:

offer a rewards program to the user, wherein the rewards program allows the user to earn a reward associated with the future purchase.

16. The system of claim 15, wherein the first notification further comprises information associated with the rewards program.

17. The system of claim 8, wherein the first notification is presented in a rich media format.

18. A computer readable medium, embodying instructions executable by the computer to perform method steps for helping a user save up money for a large purchase, the instructions comprising functionality to:

obtain historical spending data from the user;

organize the historical spending data into a plurality of spending categories;

obtain a selection of a first spending category from the user, wherein the first spending category is selected from the plurality of spending categories, and wherein the user elects to forgo spending money on purchases associated with the first spending category;

obtain a target savings amount from the user, wherein the target savings amount is how much money the user wants to save for the future purchase;

send a prompt to the user to obtain current spending data associated with the first spending category;

determine an actual savings amount in the first spending category based on current spending data; and generate a first notification for the user related to the saving money for the future purchase.

* * * * *